May 25, 1943. W. A. MARRISON 2,319,940
GRAVITATIONAL FORCE MEASURING APPARATUS
Filed Sept. 12, 1939 2 Sheets-Sheet 1
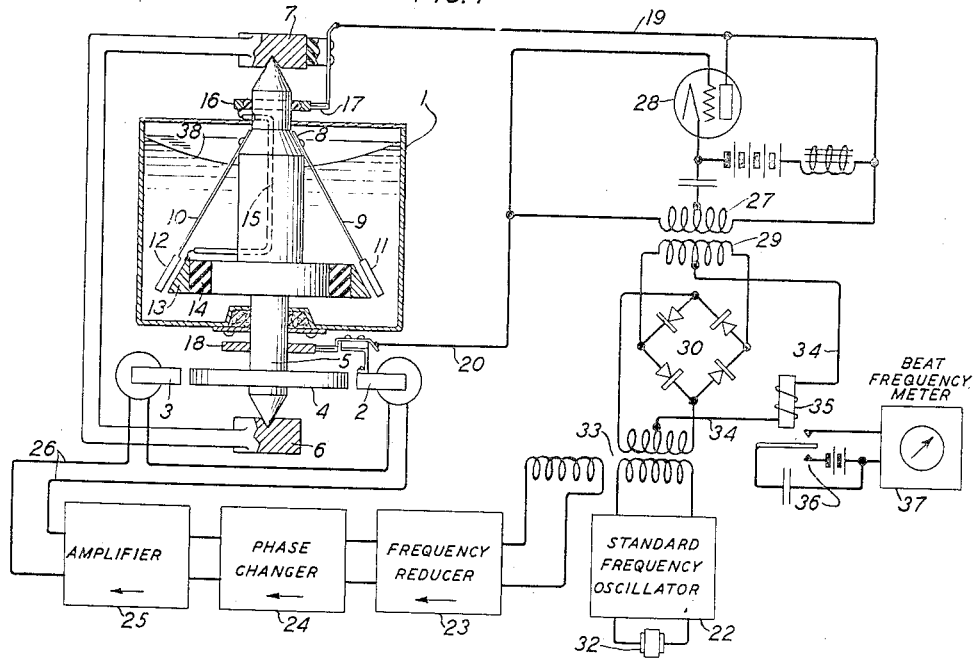
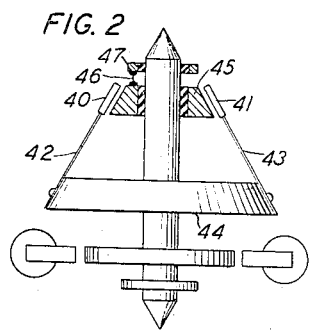
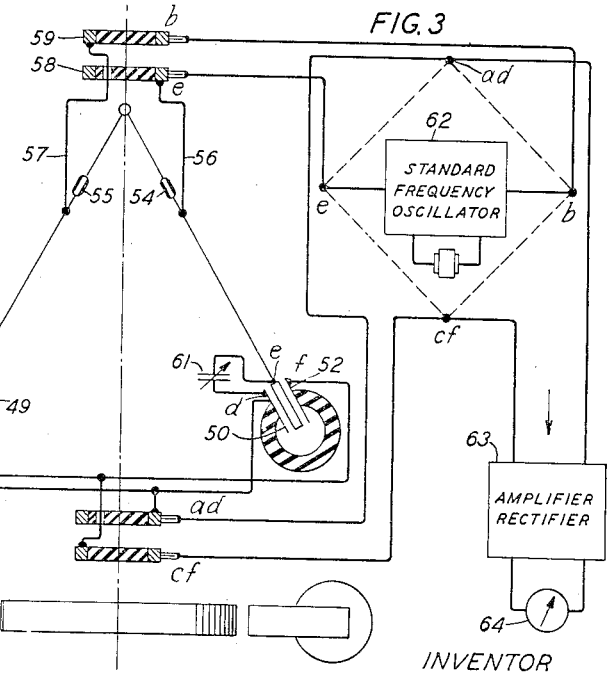
INVENTOR
W. A. MARRISON
BY
E. V. Griggs
ATTORNEY May 25, 1943.   W. A. MARRISON   2,319,940
GRAVITATIONAL FORCE MEASURING APPARATUS
Filed Sept. 12, 1939   2 Sheets-Sheet 2
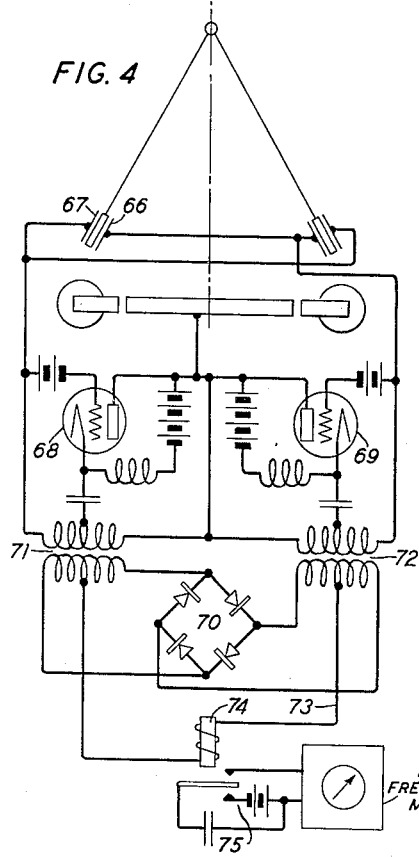
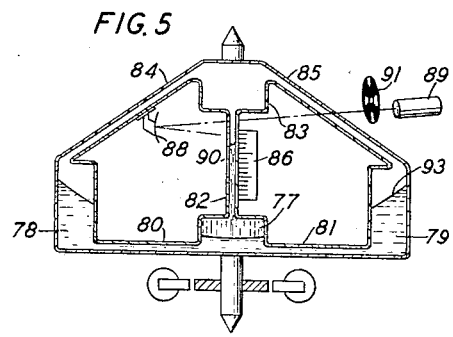
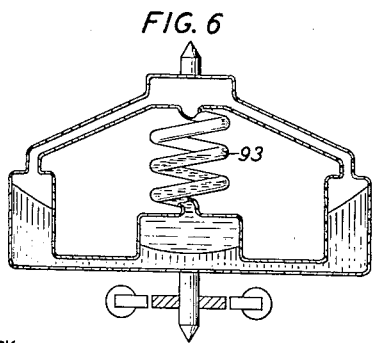
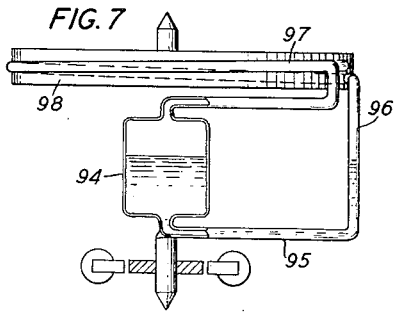
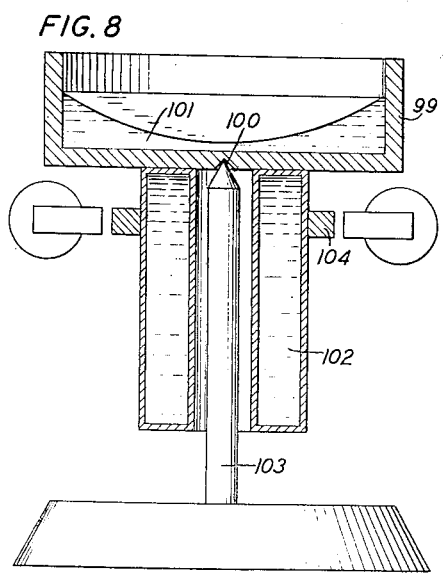
INVENTOR
W. A. MARRISON
BY
E. V. Griggs
ATTORNEY

UNITED STATES PATENT OFFICE 2,319,940

GRAVITATIONAL FORCE MEASURING APPARATUS

Warren A. Marrison, Maplewood, N. J., assignor to Bell Telephone Laboratories, Incorporated, New York, N. Y., a corporation of New York Application September 12, 1939, Serial No. 294,511

16 Claims. (Cl. 265—1.4)

This invention relates to apparatus and methods for measurements of gravitational forces.

An object of the invention is to enable gravitational forces to be measured with a high degree of accuracy.

Another object of the invention is to enable the forces to be measured continuously during transport of the measuring apparatus from one point to another.

For many purposes such as indication of the location of salt domes in oil prospecting, and construction of maps of gravity and gravity gradient in geodetic surveys, it is desirable to be able to measure the force of gravity to a high degree of accuracy with an apparatus which is of small enough mass and volume to be readily portable. An object of the invention is, therefore, to provide a gravity meter which may be portable.

An additional object of the invention is to enable accurate determination of the position of an indicating device during its operation in the course of which the indicating element may be in rotation at relatively high speed.

A further object is to increase the sensitiveness of an indicating device and the degree of accuracy to which its indications may be read by a multiplication or magnification of its effective indications.

The invention depends upon the centrifugal force developed in a mass which is rotated about a vertical axis. In one embodiment a balanced or two-bob conical pendulum is rotated at a constant speed which is fixed by a piezoelectric crystal controlled oscillator. The pendulum bobs which swing outwardly as the speed increases are so associated with other conducting members which are held fixed against outward movement as to constitute electrical capacitances therewith. The positions assumed by the bobs are determined by the resultant of the gravitational force acting in a forward direction and the centrifugal force acting outwardly from the axis of rotation. The capacitances, the magnitudes of which vary with the physical separation of the bobs from the associated conducting members, constitute a portion of the frequency-determining circuit of a vacuum tube oscillator, the frequency of which accordingly varies with the position of the bobs. A system for continuous indication of the frequency of the oscillator may therefore be calibrated to give a continuous indication of the gravitational force.

In an alternative species, the capacitances may constitute elements of a Wheatstone bridge to which is connected a standard frequency oscillator. Unbalance of the bridge which can be measured may be utilized as an index of the magnitude of the gravitational force.

Another alternative species employs a pool of mercury or other fluid which is rotated at a constant speed. The centrifugal force developed causes the outer portions of the fluid mass to rise with respect to the inner portion. Various expedients may be employed to determine the magnitude of this difference in level which thus measures the gravitational force.

It has previously been proposed to employ rotating pools of mercury as parabolic mirrors for astronomical work. The constant speed rotating system of this invention enables such devices to be made practical.

In the drawings, Fig. 1 illustrates in diagrammatic manner a constant speed conical pendulum system for measuring gravitational force;

Fig. 2 shows an alternative form of conical pendulum;

Fig. 3 shows a system in which a pendulum of the general type of Fig. 1 is associated with a standard frequency oscillator and a Wheatstone bridge;

Fig. 4 illustrates a modification of the system of Fig. 3 in which in lieu of the Wheatstone bridge of Fig. 3, two variable frequency oscillators with a beat frequency indicator are employed;

Fig. 5 illustrates schematically a rotating fluid device for measuring gravitational force;

Figs. 6 and 7 show modifications of the apparatus of Fig. 5 provided with means for magnifying the changes of indicated magnitude; and Fig. 8 shows schematically a parabolic mirror.

The centrifugal force acting upon a mass $m$ rotating with a radius $r$ about a fixed point at a constant angular velocity $\omega$ is $M\omega^2 r$. Since the mass of an object is a constant and the radius may be fixed, the centrifugal force becomes a simple function of the angular velocity. The development of electrical oscillation generators has reached the point at which it is possible to maintain the frequency of oscillations produced constant at a high degree of accuracy. Moreover, it is possible to subdivide or reduce the high frequency of standard frequency oscillations and to utilize the reduced frequency oscillations when properly amplified to operate a synchronous motor. It is, therefore, possible to subject a rotating mass, such as the bob of a conical pendulum or a body of rotating fluid to a very accurately controlled centrifugal force tending to lift the rotating mass in opposition to the gravitational force which acts in a downward direction. The various devices and systems which will be described each depend upon this principle.

Referring to Fig. 1 there is shown a closed container 1 which is mounted to enable it to be rotated by a synchronous motor having stator portions 2 and 3 and a rotor 4 fixed to a vertically mounted spindle 5 supported at its ends by conical bearings 6 and 7. The spindle 5 which carries the container 1 is provided with a conical portion 8 to which are attached flexible radius arms 9 and 10, preferably of phosphor-bronze or other similar material carrying at their lower ends plates 11 and 12 of conducting material having sufficient mass to operate effectively as a conical pendulum and having a superficial area sufficient to enable them together with the adjacent conducting ring or fixed measuring element 13 to constitute electrical capacitances. The spacing between the plates 11 and 12 and the ring 13 when the apparatus is normally at rest may be approximately 0.1 millimeter. The ring 13 is insulated from the spindle and the metallic container by a ring 14 of ceramic or other dielectric material and is provided with an electrical connection by way of the insulated conductor 15 which passes up through the spindle and out to an insulated slip ring 16 on the upper portion of the spindle. A brush 17 mounted on a stationary insulated support carried by the bearing 7 is in contact with slip ring 16 and is provided with an external connection 19. Plates 11 and 12 are connected through the conducting radius arms with the spindle 5 to which is fixed a slip ring 18. The slip ring 18 is connected by means of a brush to lead 20. It will, therefore, be seen that the capacitances of plates 11 and 12 are connected in parallel between the conductors 19 and 20. To drive the spindle 5 at fixed angular velocity, a power system is employed including a piezoelectric crystal controlled standard frequency oscillator 22, a frequency reducer 23, sometimes known as a subharmonic producer, connected thereto, a phase changer 24 connected in turn to the frequency reducer and supplying low frequency energy of the proper frequency to an amplifier 25 which is connected by the conductors 26 to the stator elements 2 and 3 of the synchronous motor. The details of the standard frequency oscillator, the frequency reducer and the amplifier are omitted for the reason that apparatus of this type is very well known in the art. However, the oscillators 22 and 28 should both be so designed as to maintain their respective frequencies constant to within considerably less than one part in a million. The synchronous motor may be of the type disclosed in U. S. Patent 1,763,000 issued June 10, 1930 to W. A. Marrison. The phase changer 24 may be of the type disclosed in U. S. Patent 1,695,051 issued December 11, 1928 to W. A. Marrison, which permits phase variations to be made in the current of a high frequency source without in any way interrupting the operation of the source. Its purpose is to enable small variations to be made in the angular velocity of the conical pendulum in order to adjust the apparatus to its most sensitive point or to enable the indication on the graduated scale to be brought to a standard or fixed point whenever desired.

Connected between conductors 19 and 20 is an inductance element 27 which serves in conjunction with the capacitances of plates 11 and 12 as the frequency-determining circuit of an electron discharge oscillator 28 of the well-known Hartley type. The inductance 27 may also serve as the primary winding of a transformer, the secondary winding 29 of which is connected to diagonally opposite points of a bridge rectifier 30 employing units preferably of the well-known copper-oxide type. The standard frequency oscillator 22, the frequency of which is held fixed by piezoelectric element 32 is connected by transformer 33 to the rectifying bridge 30 in a manner conjugate to the connection of oscillator 28. As is well known, such a balanced rectifying bridge associated with two conjugately connected oscillators will produce oscillations of the beat frequency of the two primary sources in the path 34 connecting the mid-points of the transformer secondaries. These beat frequency oscillations traverse the actuating winding 35 of a beat frequency indicating apparatus 36 of the type described in Nyquist Patent 1,611,224, December 21, 1926 and the magnitude of the beat frequency is indicated by the pointer of the beat frequency meter 37. It will be appreciated, therefore, that the meter 37 which measures the beat frequency between the oscillators 22 and 28 may be calibrated in terms of gravitational force since the frequency of the oscillator 22 is constant and that of the oscillator 28 depends upon the position of the pendulum bobs or plates 11 and 12 as determined by the gravitational force to which they are subjected.

The sealed container 1 may be partly filled with an oil bath 38 which provides mechanical damping for both the pendulum motion and the synchronous motor and protects the metal parts from corrosion while not affecting the main gravity response in any irregular manner. The oil bath also serves to equalize the temperature throughout the pendulum system.

In an alternative mode of operation the apparatus is set to give a zero or other arbitrary initial reading of the beat frequency meter. The phase changer 24 is also calibrated to enable the magnitude of the phase change which it effects to be readily indicated. Upon change of the indication of the beat frequency meter in consequence of a variation in the gravitational force the phase changer 24 may be operated to restore the indication of the beat frequency indicator to its zero or arbitrary initial indication. The magnitude or extent of the phase change required to so compensate for the variation in gravitational force is an index of the magnitude of that variation. If desired, the phase changer may be calibrated in terms of variation of gravitational force to enable the magnitude of the gravitational variation to be read directly from the calibrated scale of the phase changer. This method may be particularly useful in fixed station apparatus for checking volcanic activity and similar purposes.

Although a simple Hartley oscillator circuit has been illustrated to facilitate the explanation of the operation of the invention it should be understood that in practice a constant frequency oscillator circuit of very high stability is to be employed since any fortuitous aberrations of the oscillator frequency will yield false indications of a change in gravitational force.

Fig. 2 shows an inverted conical pendulum which enables the sensitivity of the apparatus of Fig. 1 to be considerably increased. The capacity plates 40 and 41 are supported by compression arms 42 and 43 mechanically attached at their lower ends to the supporting ring 44. A conducting ring 45 insulated from the spindle is associated through an electrical conductor 46 with slip ring 47 to enable the proper electrical connections to be made to the device during its rotation. The springs 42 and 43 will preferably be provided with a proper degree of stiffness, depending upon the sensitivity required, to avoid instability or hunting. The capacitance of such an apparatus will change very much more rapidly than will that of Fig. 1.

Fig. 3 shows diagrammatically a modified system in which the conical pendulum provides four variable capacitance elements which are connected to form a Wheatstone bridge. Connected in conjugate fashion to the Wheatstone bridge are a standard frequency oscillator, an amplifier-rectifier, and an indicator to measure unbalance in the bridge occasioned by changes in the position of the pendulum bobs. Mounted adjacent to the pendulum bobs in the position corresponding to ring 13 of Fig. 1 are ring segments 49 and 50 which are insulated from each other. Correspondingly positioned outer ring segments 51 and 52 also closely adjacent the pendulum bobs and insulated from each other are supported from the inner segments by supports 53 of ceramic or other non-conducting material. In order to insulate the pendulum bobs from each other, strain insulators 54 and 55 are inserted in the radius arms and the bobs with the lower conducting portions of their respective radius arms are connected by conductors 56 and 57 to slip rings 58 and 59. The conducting elements of the capacitance devices are designated $a$, $b$, $c$ in the case of one pendulum, $d$, $e$, $f$ in the case of the other. To make clear the relation of these capacitances in the Wheatstone bridge the same characters are applied to their associated slip rings and to the junction points of the bridge in which the dotted lines designate the arms which are represented by the capacitances of the pendulum. For example, the points $a$ and $b$ of the pendulum representing the outer segmental plate and the bob respectively which form the electrodes of the outer variable capacitance are connected through slip rings $ad$ and $b$ to the terminal points of the bridge designated by $ad$ and $b$, respectively. Standard frequency oscillator 62 is connected across one diagonal of the bridge and amplifier-rectifier 63 which supplies the rectified unbalance currents to indicator 64 is connected across the terminals of the conjugate diagonal of the bridge. Variable condenser 61 is provided in shunt to the capacitance between $d$ and $e$ in order to balance the bridge at the outset. It is to be understood that in the system of Fig. 3, as also in the case of each of the other systems disclosed in this application, there is employed a constant frequency power supply apparatus for driving the synchronous motor including a standard frequency oscillator, a frequency reducer, a phase changer and an amplifier as shown in Fig. 1.

It will be apparent that as the bobs move inwardly in response to an increased gravitational force, the capacitances $b$, $c$ and $d$, $e$ will increase while the other two capacitances will decrease. The two increasing capacitances are connected in non-adjacent arms of the Wheatstone bridge so that the unbalance occasioned by their increase with the simultaneous decrease of the other two capacitances produces an accentuated effect upon the amplifier-rectifier 63. As in the case of Fig. 1, the indicator 64 may be calibrated in terms of gravitational force.

In the system of Fig. 4, the conical pendulum is like that of Fig. 3 except that the bobs need not be insulated from each other and an electrical connection to them may, therefore, be had through the supporting spindle and the casing of the apparatus. An inner ring 66 associated with both bobs and an outer ring 67 similarly associated with them, form two capacitances, the one of which increases as the other decreases. The rings 66 and 67 are, of course, insulated from each other and from the spindle and casing of the apparatus. The slip rings for connecting rings 66 and 67 to the circuit are omitted to simplify the drawings. Two highly stable constant frequency electron discharge oscillators 68 and 69, shown for simplicity of explanation as of the well-known Hartley type, each utilize one of the variable capacitances as a portion of its frequency-determining circuit. Accordingly, when the bobs change in position the frequency of oscillator 68 will change and that of oscillator 69 will change in the opposite direction. It is accordingly possible to measure any change in position of the bobs by the beat difference frequency between the two oscillators. In order that this may be done, a four-arm rectifier bridge 70 of well-known type, preferably consisting of copper-oxide rectifiers, is connected by transformers 71 and 72 to the oscillators 68 and 69 by conjugate connections. A path 73 connected between the electrical mid-points of the secondary windings of transformers 71 and 72 receives beat frequency pulses from the bridge rectifier 70 and supplies them to the actuating winding 74 of the beat frequency indicator 75. The indicating instrument of the beat frequency indicator may, as in the previous systems, be calibrated in terms of gravitational force.

Fig. 5 discloses an apparatus in which the conical pendulum is replaced by a rotating container in which is placed a quantity of a fluid such as mercury. As shown, the container comprises a central receptacle 77 and two side receptacles 78 and 79 connected therewith by conduits 80 and 81 which permit free flow of heavy fluid. The container may be constructed of glass or other transparent material to permit direct view of the mercury surface. Rising along the axis of rotation from the top of the receptacle 77 is a capillary tube 82 which opens into an upper receptacle 83 also connected to the side receptacles 78 and 79 by inclined channels 84 and 85. A lighter liquid 90, preferably colored in order to give a very definite indication and non-miscible with the heavy liquid beneath may be introduced into receptacle 83. The capillary tube 82 is provided with a graduated scale as indicated at 86. The entire structure is mounted on a vertical spindle and driven by a synchronous motor of the type employed in the systems previously described. In order that the indications of the rotating scale may be conveniently read a mirror 88 is supported from one of the inclined channels and is so positioned as to reflect directly toward the viewing telescope 89 once during each revolution an image of the upper meniscus of the column of colored liquid 90 in the capillary tube. In order to eliminate the optical effect of motion of the parts a stroboscopic device 91 driven in synchronism with the rotating apparatus may be interposed between the viewing instrument 89 and the rotating apparatus. It will be understood that with the apparatus at rest the heavy liquid in the receptacles 78 and 79 settles to a somewhat higher level than in the receptacle 77 because of the mass of the lighter liquid extending up through the capillary tube 82 and into the receptacle 83. When the device is set in rotation, the centrifugal force impels the heavy fluid outwardly through small area channels 80 and 81 into the side receptacles 78 and 79 where it finally assumes a curved upper contour as indicated at 93. The level of the heavy liquid in the receptacle 77 falls and the lighter colored liquid from the receptacle 83 drains down through the capillary tube to some such position as shown in Fig. 5. Inasmuch as the mass of the heavy material may be many times that of the lighter material, a small shift in position of the surfaces 93 may be utilized to cause a very great shift in the position of the column in the capillary tube. When, for example, mercury is employed as the heavier liquid and dibutyl phthalate as the lighter liquid, there is available a specific gravity ratio of the order of 12 to 1. The space above the two fluids may be evacuated or may be occupied by gas. However, it is possible to still further increase the sensitivity of the apparatus by filling the space above the two liquids with a third preferably colorless liquid non-miscible with either of the other two. The theoretical limit of the sensitivity in this case is such that the normal motion of the meniscus of the column of colored liquid in the capillary tube 82 is multiplied by the ratio of the area of the receptacle 77 at the interface of the heavy liquid and the colored liquid to the area of the capillary tube 82 at the interface between the colored liquid and the colorless liquid.

Fig. 6 shows a modification of the apparatus of Fig. 5 in which an additional magnification is obtained by forming the capillary tube in the form of a helix 93. This enables graduations along the helix to be spaced considerably further apart since the vertical rise of the colored fluid is unchanged.

The device of Fig. 7 affords high sensitivity, even with the use of a single fluid such as mercury. In this apparatus the lower end of the reservoir 94 terminates in a small area tube 95 which extends some distance radially, then connects through a vertical riser 96 to a capillary tube 97 arranged in a true circle exactly perpendicular to the axis of rotation. The capillary indicator tube 97 may be supported in the V of an accurately machined circular metal part 98 as shown, the part 98 and the tube 97 together constituting a fixed measuring element with respect to the movable upper surface of the mercury indicator column. In this apparatus the magnification obtained is the ratio of the area of the large reservoir 94 to that of the capillary. If the capillary has a bore of 0.2 millimeter and the reservoir is 3 centimeters in diameter, the magnification expected would be in excess of 20,000 times. With the assumed 10 centimeters normal head of mercury the motion of the indicator column should be two millimeters for a change in gravity amounting to one part in a million. A still greater sensitivity may be obtained if the tube 97 be given a helical form so that instead of lying in the plane perpendicular to the axis the capillary tube will have a definite pitch downward with the lower portion adjacent the riser 96.

The total variation in the force of gravity at sea level with change of latitude amounts to about one-half of one per cent. It would therefore be possible to use devices of the type described on shipboard to indicate roughly the latitude of the ship's position. Another possible use is in the continuous measurement of the effect on gravity of solar and lunar tides and of the changes in gravity occurring in the neighborhood of active volcano and earthquake zones.

Fig. 8 shows a parabolic mirror comprising an open container 99 supported by a conical bearing 100 at the upper end of a fixed vertical spindle and mounted for rotation in the manner of the devices which have already been described. A mass of mercury 101 within the container will assume a surface contour of parabolic form. To stabilize motion of the container 99 and to avoid precession and hunting, a cylindrical tank 102 containing a damping fluid such as a heavy viscous oil is suspended from the container 99 to rotate therewith. A central well through the tank accommodates the fixed supporting spindle 103. The rotor 104 of the driving motor is mounted on the tank 102 as indicated in the drawing. The phase-changing system enables the driving speed to be nicely adjusted to vary the parabolic contour as desired. Rotating masses of mercury have previously been proposed as mirrors for telescopes in astronomical work but it is understood that they have not been found particularly successful for the reason that it has been difficult to maintain a constant curvature of the surface. The use of a constant frequency rotational system of the type employed in the systems embodying this invention should largely obviate that difficulty.

What is claimed is:

1. A device for indicating gravitational effects comprising a rotating element, constant speed means for driving said element, a column of liquid carried by the rotating element near its axis of rotation, a second column of liquid carried by the element at a peripheral point remote from the axis, a liquid conveying conduit connecting the columns, and means responsive to the difference in heights of said columns when the element is rotating for indicating the gravitational force exerted upon the liquid.

2. A force measuring system comprising a substantially constant speed motor, a conical pendulum driven thereby and constituting with a juxtaposed conducting element an electrical capacity unit, and means responsive to variations in the capacity of the unit in consequence of changes of position of the pendulum to indicate the magnitude of the gravitational force acting upon the pendulum.

3. A device for measuring the force of gravity comprising a container, means for rotating the container about a vertical axis at a highly constant angular speed, and means for measuring the rise of the surface of a heavy liquid in the container at a point remote from the axis of rotation and for indicating the rise in terms of the gravitational force acting on the liquid.

4. An apparatus for measuring variations in gravitational force comprising a source of highly constant frequency oscillations, a synchronous motor connected to said source and controlled in its speed by the constant frequency oscillations, a system mounted to rotate about a vertical axis comprising the rotor of the synchronous motor and a conical pendulum having an electrically conducting bob adjacent to but insulated from another conducting member carried by the rotating system to form an electrical capacitance therewith whereby said capacitance varies in magnitude with variations in gravitational force which affect the pendulum bob, and means for indicating the magnitude of the electrical capacitance while the rotating system is in rotation.

5. An apparatus in accordance with claim 4 characterized in this that the capacitance of the bcb constitutes part of the frequency-determining system of an electron discharge oscillator which together with an independent oscillator of highly constant frequency is connected to a beat frequency indicator to indicate frequency differences of the two oscillators.

6. An apparatus in accordance with claim 4 characterized in this that the conical pendulum has a plurality of depending bobs symmetrically disposed with respect to the axis of rotation.

7. An apparatus for measuring variations in gravitational force comprising a conical pendulum having two electrically conducting bobs insulated from each other and mounted for rotation about a vertical axis and respectively associated with capacity elements to constitute a pair of capacitances, a Wheatstone bridge in which the two capacitances are electrically connected to form diagonally opposite arms, a source of oscillations connected to one pair of diagonally opposite terminals of the bridge, means for balancing the bridge at the frequency of said source, an electrical indicator connected to the other two terminals of the bridge and a highly constant speed motor associated in mechanical driving relation with the conical pendulum to cause it to rotate.

8. An apparatus in accordance with claim 7, characterized in this that each bob is associated with a pair of capacity elements respectively to form four electrical capacitances which constitute the four arms of the Wheatstone bridge.

9. A system comprising a container mounted for rotation about a vertical axis, a fluid in the container which is free to adjust the position of its upper surface within the container in accordance with the speed of rotation, a synchronous motor connected to the container to cause it to rotate, a source of highly constant frequency current connected to the motor to cause it to operate at a constant speed, a constantly acting phase changer connected between the source and the motor to vary the effective frequency of the current supplied to the motor, and means for varying at will the magnitude of the phase change produced.

10. An indicator of change in gravitational force comprising a receptacle mounted for rotation about a vertical axis, a mass of liquid in the container, a highly constant speed motor system connected to the container to cause it to rotate whereby the upper surface of the outermost portion of the liquid tends to rise, an upwardly extending tube connected to the outer portion of the container to permit liquid to rise therein, and means associated with the tube to indicate the height of an upper meniscus of the liquid in the tube.

11. An indicator according to claim 10 characterized in this that the tube is inclined whereby the motion of the liquid meniscus therein is magnified.

12. An indicator according to claim 10 characterized in this that the connection between the upwardly extending tube and the container is by way of small area channels to introduce a stabilizing factor tending to retard motion of liquid therethrough whereby the stability of the position of the meniscus is enhanced.

13. A gravity measuring system comprising a mass mounted for rotation, the mechanical constraints of a portion of the mass being such as to permit displacement of that portion under the combined force of gravity and of rotation and means for indicating the magnitude of the displacement of the rotating portion comprising a scale mounted in fixed position on a support rotating with the mass adjacent the surface of the movable portion and a stroboscopic system for viewing the displacement of the surface relative to the scale.

14. An altitude measuring apparatus comprising a container mounted for horizontal rotation about a vertical axis, a highly constant speed motor connected in driving relation to said container to cause it to undergo horizontal rotation about the vertical axis, means within the container adapted under a combined influence of centrifugal action and gravitational force to present a surface which varies in position with change in gravitational force, said means including a partial filling of liquid and an indicator operatively connected to the altitude measuring apparatus to provide a visual indication of the instantaneous magnitude of the gravitational force in accordance with variations of the varying position surface within the container.

15. In combination, a constant speed motor, a container mounted for rotation about a vertical axis and connected by a driving coupling to the motor to be rotated in a horizontal trajectory about the vertical axis, a partial filling of a heavy liquid within the container, the upper surface of which assumes a position dependent upon the force of gravitation and upon the centrifugal action and means dependent upon the position of the surface for indicating the magnitude of the gravitational force.

16. A system for measuring variations in gravitational force comprising a source of highly constant frequency oscillations, a synchronous motor connected to the source, a supporting structure, mounted for rotation about a vertical axis, connected to the motor to be maintained in rotation thereby, a mass supported by the supporting structure but free to undergo a limited lateral displacement in a direction away from the axis of rotation in consequence of the centrifugal force engendered by its rotational movement, a measuring member rigidly attached to the supporting structure so as to maintain a fixed position relative to the vertical axis of the supporting structure which position is accordingly unaffected by said centrifugal force, the measuring member being disposed in proximity to a surface of the mass which varies in position in consequence of displacement of the mass and means for measuring and indicating the linear displacement of the proximate surface of the mass with respect to the fixed position measuring member.

WARREN A. MARRISON.